W. H. HOLLIS.
GUIDE METER.
APPLICATION FILED SEPT. 18, 1915. RENEWED MAR. 20, 1919.
1,320,470.
Patented Nov. 4, 1919.
2 SHEETS—SHEET 1.
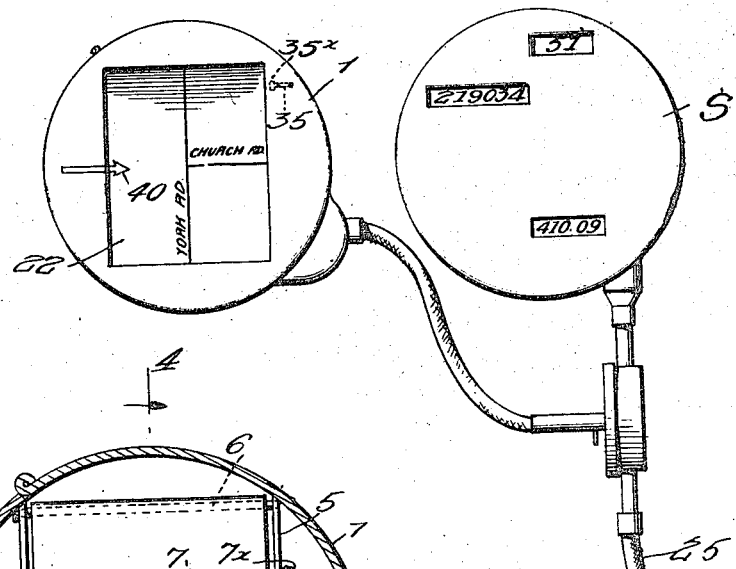
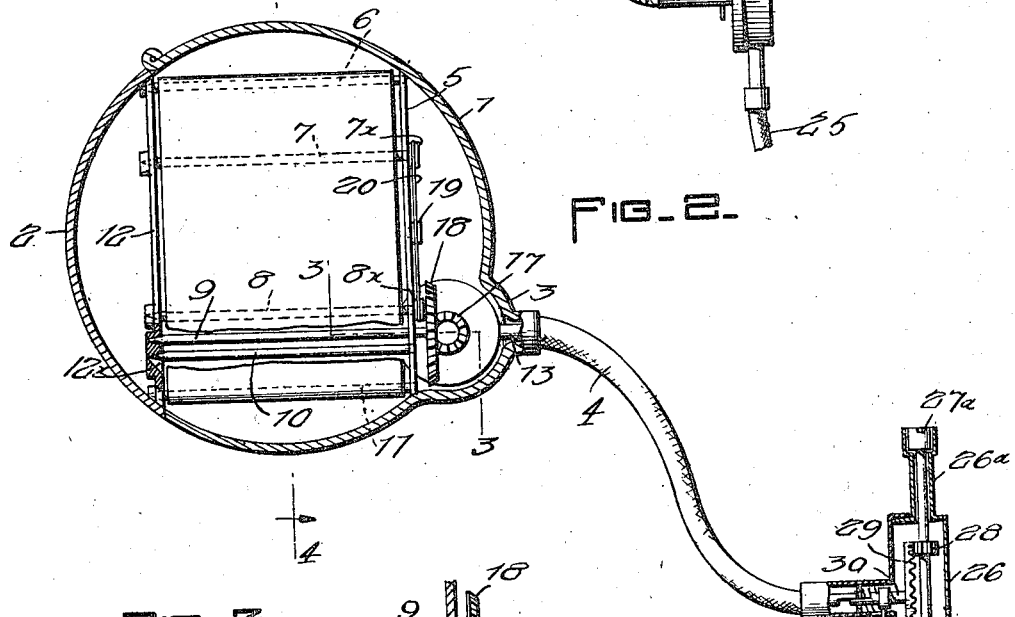
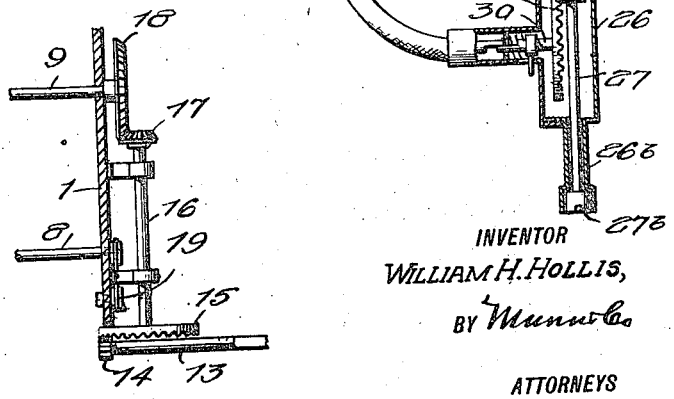
WITNESSES:
J. H. Phillips
R. H. Stanley
INVENTOR
WILLIAM H. HOLLIS,
BY Munn & Co
ATTORNEYS W. H. HOLLIS.
GUIDE METER.
APPLICATION FILED SEPT. 18, 1915. RENEWED MAR. 20, 1919.
1,320,470.
Patented Nov. 4, 1919.
2 SHEETS—SHEET 2.
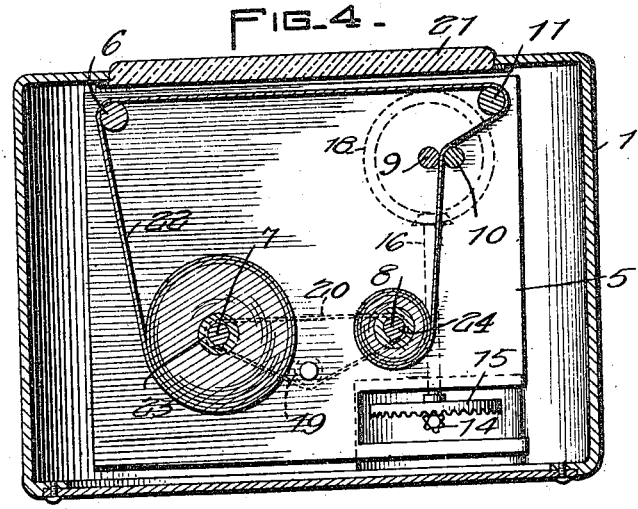
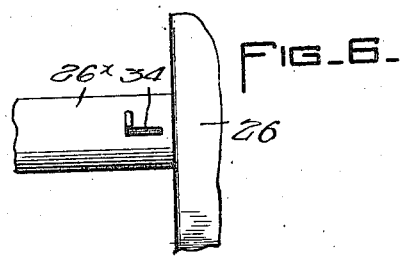
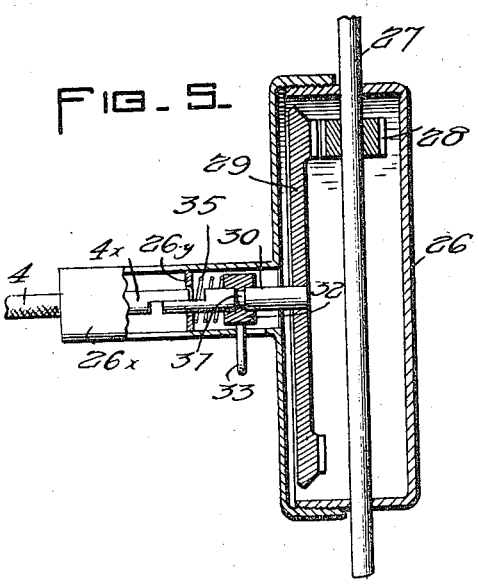
WITNESSES:
J. H. Phillips
R. A. Stanley
INVENTOR
WILLIAM H. HOLLIS
BY Munn & Co
ATTORNEYS

UNITED STATES PATENT OFFICE.

WILLIAM H. HOLLIS, OF PHILADELPHIA, PENNSYLVANIA.

GUIDE-METER.

1,320,470.  Specification of Letters Patent.  Patented Nov. 4, 1919.

Application filed September 18, 1915, Serial No. 51,340. Renewed March 20, 1919. Serial No. 283,834.

*To all whom it may concern:*

Be it known that I, WILLIAM H. HOLLIS, a citizen of the United States, and a resident of Philadelphia, in the county of Philadelphia and State of Pennsylvania, have invented a certain new and useful Improvement in Guide-Meters, of which the following is a specification.

My invention relates to improvements in guide-meters, more especially in those guide-meters which are used in connection with automobiles for touring purposes, and it consists in the combinations, constructions, and arrangements herein described and claimed.

An object of my invention is to provide a guide-meter which indicates accurately to the chauffeur or to passengers in the automobile every town, curve, cross road, railroad crossing, hotel, and garage *en route.*

A further object of my invention is to provide a device of the type described which can be attached very quickly to any speedometer and which is run by the flexible transmission member which runs the speedometer.

A further object of my invention is to provide a device of the type described which is simple in construction, and which will therefore not easily get out of order.

A further object of my invention is to provide a guide-meter which may be disconnected from its power means so as to provide for side trips in which the guide-meter is not used, but which can be immediately brought into operative relation so as to commence operation again when the journey is resumed.

Other objects and advantages will appear in the following specification, and the novel features of the invention will be particularly pointed out in the appended claims.

My invention is illustrated in the accompanying drawings forming part of this application, in which—

Figure 1 is a face view of the device, showing its connection with the operating mechanism of a speedometer.

Fig. 2 is an enlarged sectional view through the device, a portion of the driving means also being shown in section.

Fig. 3 is a section along the line 3—3 of Fig. 2.

Fig. 4 is a section along the line 4—4 of Fig. 2.

Fig. 5 is an enlarged section through a portion of the transmision, showing the means for disconnecting the same so as to put the guide-meter out of commission.

Fig. 6 is a detail view showing the means for locking the disconnecting means.

In carrying out my invention, I make use of a cylindrical casing 1 which is preferably made of metal and which is provided with a door 2 on one of the curved sides. This casing has an extension 3 which is arranged to receive a flexible drive or transmission member 4.

Disposed within the casing is a plate 5 which carries shafts 6, 7, 8, 9, 10, and 11 respectively. The door 2 bears a plate 12 which is recessed to provide bearings for the ends of the shafts, the latter being preferably pointed so as to easily enter the recesses. The shaft 10 has a movement toward and away from the shaft 9 for a purpose to be explained later. In order to provide for this movement, I make a cut-away portion $12^x$ as shown in Fig. 2.

Referring now particularly to Fig. 3, it will be seen that there is a short drive shaft 13 which communicates with the interior drive member of the flexible transmission 4. A gear or pinion 14 on the shaft 13 meshes with a gear 15 on a shaft 16. The latter bears a gear 17 which meshes with a gear 18 on the shaft 9. The shafts 7 and 8, as will be seen from Fig. 2, extend through the plate 5, the shaft 7 being provided with a pulley $7^x$ while the shaft 8 is provided with a pulley $8^x$. An idler 19 is secured to the exterior of the plate 5 and a flexible driving member 20 passes around the pulley $7^x$, the pulley $8^x$, and the idler 19.

In the front side of the casing 1 is a glazed opening 21. A tape or sheet 22 which is provided with the indicating data, such as the names of the cross roads, towns, and other legends, is wound around a spool 23 on the shaft 7. The end of the tape or sheet is then passed over the shafts 6 and 11, and then between the shafts 9 and 10, and is secured to a spool or reel 24 on the shaft 8. As stated before, the shaft 10 may be moved away from the shaft 9 so as to permit the entrance of the tape between the shafts 9 and 10, and when the door 2 is closed, the shaft 10 is forced into position so as to press the sheet firmly against the roller 9. It will be observed that the portion of the tape or sheet between the shafts 6 and 11 appears before the window 21 as shown in Fig. 1.

The means for driving the tape 22 is best shown in Figs. 1 and 2. In Fig. 1 I have shown a speedometer S which may be of any suitable type, this speedometer being driven by a flexible transmission 25, also of any suitable nature. In connecting up the guide-meter, I interpose between the end of the flexible drive and the speedometer, the mechanism shown in Fig. 2. This consists of a casing 26 having extended end portions 26$^a$ and 26$^b$. Extending through this casing is a shaft 27 having an upper end 27$^a$ and a lower end 27$^b$, each of these portions being arranged to connect with the corresponding parts of the speedometer and the transmission so as to transmit motion to the speedometer in the ordinary way. On the shaft 27 is a pinion 28 which is arranged to mesh with a gear 29 on a shaft 30 extending out at right angles to the shaft 27. As will be seen from Fig. 5, the casing 26 is provided with a lateral extension 26$^x$ having a partition 26$^y$. The shaft 30 is provided with a groove 31 into which the central tongue of a collar 32 extends. The collar is provided with a thumb piece 33 which extends through an L-shaped slot 34 in the extension 26$^x$, see Fig. 6. A spring 35 is disposed within the extension 26$^x$ and bears at one end on the partition 26$^y$ and at the other end on the collar 32. This arrangement permits the guide-meter to be disconnected from the driving mechanism as will be hereinafter explained.

From the foregoing description of the various parts of the device, the operation thereof may be readily understood.

This device is used preferably as stated in connection with the drive mechanism of a speedometer, and may be arranged in close proximity to the speedometer. The end of the flexible drive mechanism may be detached from the speedometer and the casing 26, with its extended end, may be inserted in lieu thereof, and the parts may be fastened together without any necessity of changing the connection. The end of the flexible drive member 4 projects into the casing extension 26$^x$ as shown in Fig. 5. With the parts arranged as shown, the rotation of the flexible drive member 25 of the speedometer will cause the rotation of the gear 28 and of the gear 29, and hence of the shaft 30, see Fig. 5. This has a slidable connection with the shaft 4$^x$ which is at the end of the flexible drive member 4, and thereby causes the turning of the latter. The power from the flexible driving mechanism 4 is transmitted through the shaft 13, pinion 14, shaft 16, pinion 17, gear 18, to the shaft 9, which presses upon the tape or sheet 22, and thereby tends to pull it off from the spool or reel 23, see Fig. 4. This turns the shaft 7, and the latter being connected by a flexible belt or cable 20 with the shaft 8, the latter shaft is rotated so that that part of the tape or sheet which is drawn off from the spool 23, is wound onto the spool 24 by the rotation of the shaft 8. The tape in its movement passes before the window 21, and may be viewed by the driver of the vehicle. The device is geared preferably to move the tape 22 at the rate of an inch a mile, although it is obvious that a greater or less speed might be obtained merely by using gears of different ratios, without departing from the spirit of the invention. In any event, the tape travels so that the indicating marks appear opposite the arrow points 40 as the vehicle reaches the corresponding road or turn on its route.

It may be that at times one would wish to take a side trip, and in such case the thumb piece 33 is pushed to the end of the L-shaped slot 34 and then is rotated slightly so as to bring it into position where the shaft 30, together with the gear 29, will be retracted against the tension of the spring 35. This will disconnect the two gears 29 and 28, and therefore the guide-meter will be put out of commission for the time being. When the party returns to the main road, the thumb piece 33 may be moved to again connect the gear 29 with the gear 28, thereby connecting it with the guide-meter.

The points *en route* are printed on both sides of the tape 22 so that the same may be used for the return trip.

I claim:—

1. In a guide-meter, a casing provided with a glazed opening and having a door, a plate disposed within said casing, a plurality of shafts journaled at one end in said plate, a second plate carried by the door, said last named plate being provided with bearings for the ends of said shafts when the door is closed, a tape or strip disposed on a spool carried by one of said shafts, the end of said tape being passed over certain of said shafts and between certain other of said shafts in contact with the latter and being secured to an empty spool on another of said shafts, and means for driving one of the shafts in contact with the tape or strip.

2. In a guide-meter, a casing provided with a glazed opening and having a door, a plate disposed within said casing, a plurality of shafts journaled at one end in said plate, a second plate carried by the door, said last named plate being provided with bearings for the ends of said shafts when the door is closed, a tape or strip disposed on a spool carried by one of said shafts, the end of said tape being passed over certain of said shafts and between certain other of said shafts in contact with the latter and being secured to an empty spool on another of said shafts, means for driving one of the shafts in contact with the tape or strip, and means for driving the shaft bearing the empty spool whereby the tape or strip is wound on the empty spool.

3. In a guide-meter, a casing provided with a glazed opening and having a door, a plate disposed within said casing, a plurality of shafts journaled at one end in said plate, a second plate carried by the door, said last-named plate being provided with bearings for the ends of said shafts when the door is closed, a tape or strip disposed on a spool carried by one of said shafts, the end of said tape being passed over certain of said shafts and between certain other of said shafts in contact with the latter and being secured to an empty spool on another of said shafts, means for driving one of the shafts in contact with the tape or strip, and means for driving the shaft bearing the empty spool whereby the tape or strip is wound on the empty spool, said last named means comprising pulleys carried by said spool bearing shafts, an idler secured to the casing, and a flexible driving member connecting said pulleys and said idler.

WILLIAM H. HOLLIS.

Witnesses:
 WILLIAM R. HAGENBAUGH,
 ELMER MILLER.